(12) United States Patent
Mahadik et al.

(10) Patent No.: US 10,082,083 B2
(45) Date of Patent: Sep. 25, 2018

(54) FALSE START DRAIN SYSTEM WITH VERTICAL HEADER

(71) Applicant: General Electric Company, Schenectady, NY (US)

(72) Inventors: Dhiraj Lahukant Mahadik, Bangalore (IN); Venugopala Durwasula Raju, Bangalore (IN); Anil Kumar Dasoji, Bangalore (IN)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 14/978,261

(22) Filed: Dec. 22, 2015

(65) Prior Publication Data
US 2017/0175638 A1   Jun. 22, 2017

(51) Int. Cl.
*F02C 7/22* (2006.01)
*F02C 7/232* (2006.01)

(52) U.S. Cl.
CPC .............. *F02C 7/232* (2013.01); *F02C 7/222* (2013.01)

(58) Field of Classification Search
CPC .... F02C 7/222; F02C 7/232; F05D 2260/602; F23D 2209/30; F23K 2301/203; F01D 25/32; Y10T 137/5762
USPC ...................................................... 60/39.094
See application file for complete search history.

(56) References Cited

U.S. PATENT DOCUMENTS

| | | | | |
|---|---|---|---|---|
| 637,963 | A * | 11/1899 | Howard | F16N 33/00 141/106 |
| 1,758,643 | A * | 5/1930 | Baetz | F28D 7/08 165/122 |
| 2,108,690 | A * | 2/1938 | Montgomery | C10G 50/00 208/299 |
| 2,481,931 | A * | 9/1949 | Frank | F16C 33/06 29/447 |
| 4,062,183 | A * | 12/1977 | Davies | F02C 7/228 137/597 |
| 4,402,184 | A * | 9/1983 | Faulkner | F02C 7/222 60/739 |
| 4,964,270 | A * | 10/1990 | Taylor | F02C 7/232 60/39.094 |
| 5,263,314 | A * | 11/1993 | Anderson | F02C 7/222 137/312 |
| 5,540,264 | A * | 7/1996 | Harp | B67D 1/0842 141/106 |
| 6,349,536 | B1 * | 2/2002 | Fujioka | F02C 3/30 60/39.55 |
| 6,681,556 | B2 * | 1/2004 | Mistry | F23K 5/18 60/39.094 |
| 7,664,590 | B2 | 2/2010 | Runkle et al. | |
| 2006/0086094 | A1 | 4/2006 | Runkle et al. | |
| 2007/0101723 | A1 * | 5/2007 | Kunkle | F01D 25/007 60/772 |

(Continued)

*Primary Examiner* — Ted Kim
(74) *Attorney, Agent, or Firm* — Nixon & Vanderhye P.C.

(57) ABSTRACT

A drain system for a combustor of a gas turbine includes a plurality of drain tubes, a vertical header connected to an end of each drain tube to receive a fluid flow therefrom, and a horizontal header downstream of the vertical header and in fluid communication therewith. Each drain tube has another end adapted to be connected to a respective combustor can of the gas turbine to drain liquid therefrom. The vertical header is disposed at an angle between 30° and 90° with a horizontal plane.

16 Claims, 4 Drawing Sheets

(56) References Cited

U.S. PATENT DOCUMENTS

2008/0087300 A1\* 4/2008 Kohler .................. F01D 25/002
 134/18
2011/0232313 A1\* 9/2011 Chillar ................... F01D 25/12
 62/285

\* cited by examiner

FALSE START DRAIN SYSTEM WITH VERTICAL HEADER

FIELD OF THE INVENTION

This invention relates generally to gas turbine engines, and more particularly to a combustor drain system for gas turbine engines.

BACKGROUND OF THE INVENTION

At least some known gas turbine engines include a compressor section, a combustor section, and at least one turbine section. The compressor compresses air, which is mixed with fuel and then channeled to the combustor. The mixture is then ignited generating hot combustion gases. The combustion gases are channeled to the turbine which extracts energy from the combustion gases for powering the compressor, as well as producing useful work to power a load, such as an electrical generator, or to propel an aircraft in flight.

During a starting sequence, the engine is rotated to a predetermined speed, fuel is introduced, and an ignitor is energized. Sometimes the gas turbine engine fails to start properly, and/or the flame in the gas turbine engine is inadvertently extinguished. In either case, some liquid fuel, which is not burned, may remain in the gas turbine engine. Such fuel may be drained from the combustor by a drain system. However, if fuel becomes trapped in the drain system because of poor drainage, local ignition may occur if the temperature in the drain system reaches an auto-ignition temperature.

BRIEF SUMMARY OF THE INVENTION

One aspect of the disclosed technology relates to a combustor can drain system having a vertical header.

Another aspect of the disclosed technology relates to a combustor can drain system having a plurality of drain tubes routed directly to a vertical header without employing zig-zag routing techniques intended to increase heat transfer of hot gases and to reduce mass flow of the gases.

One exemplary but nonlimiting aspect of the disclosed technology relates to a drain system for a combustor of a gas turbine, comprising: a plurality of drain tubes, each drain tube having a first end adapted to be connected to a respective combustor can of the gas turbine to drain liquid therefrom; a vertical header connected to a second end of each drain tube to receive a fluid flow therefrom; and a horizontal header downstream of the vertical header and in fluid communication therewith, wherein the vertical header is disposed at an angle between 30° and 90° with a horizontal plane.

Other aspects, features, and advantages of this technology will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various examples of this technology. In such drawings.

DETAILED DESCRIPTION OF THE ILLUSTRATED EMBODIMENTS

Figure 1:
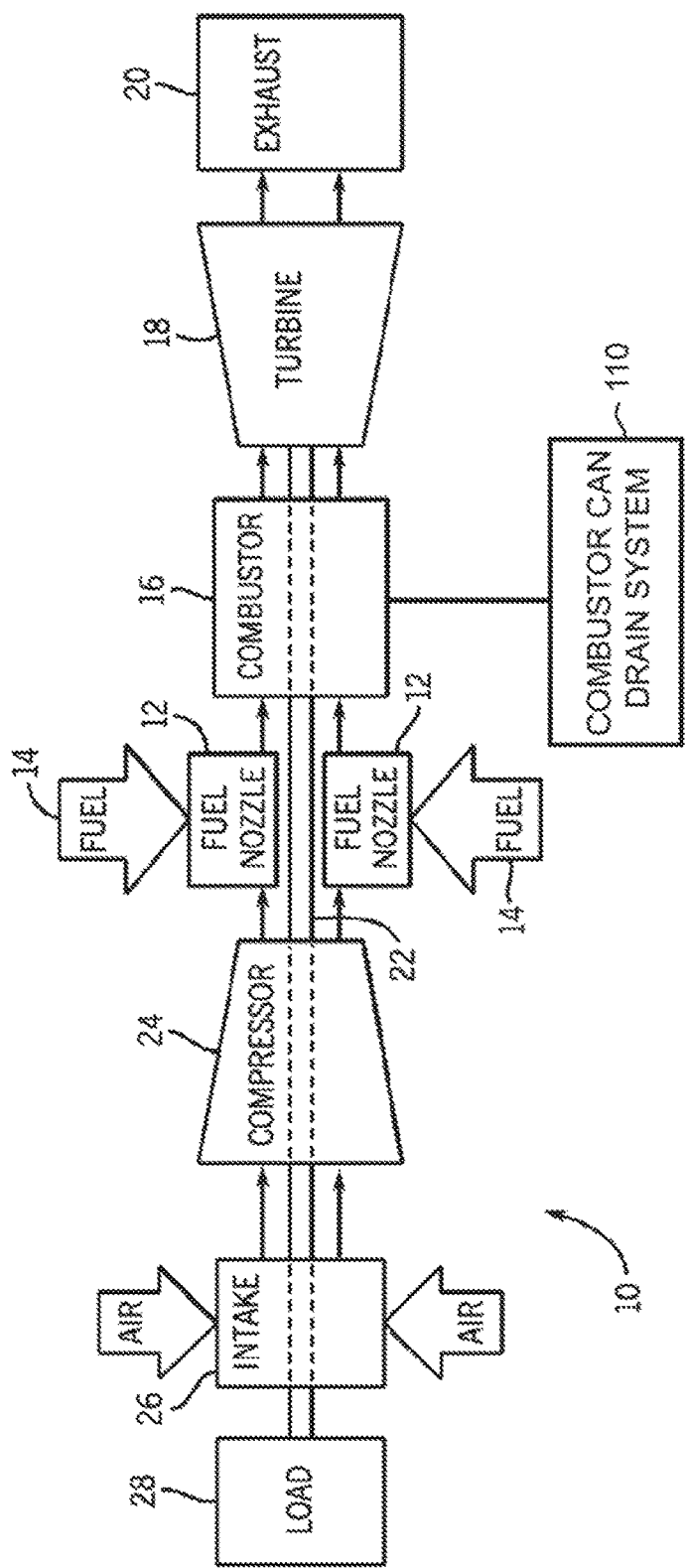
FIG. 1 is a block diagram of a turbine system having a combustor can drain system in accordance with an example of the disclosed technology.

Referring to FIG. 1, a block diagram of an embodiment of a turbine system 10 is illustrated. As discussed in detail below, the disclosed turbine system 10 may employ a combustor can drain system 110. The turbine system 10 is capable of using liquid fuel and may be a dual fuel system capable of using liquid fuel and gas fuel, as those skilled in the art will understand.

As depicted, a plurality of nozzles 12 intakes a fuel supply 14, mixes the fuel with air, and distributes the air-fuel mixture to a combustor 16. The air-fuel mixture combusts in a chamber within combustor 16, thereby creating hot pressurized exhaust gases.

Figure 2:
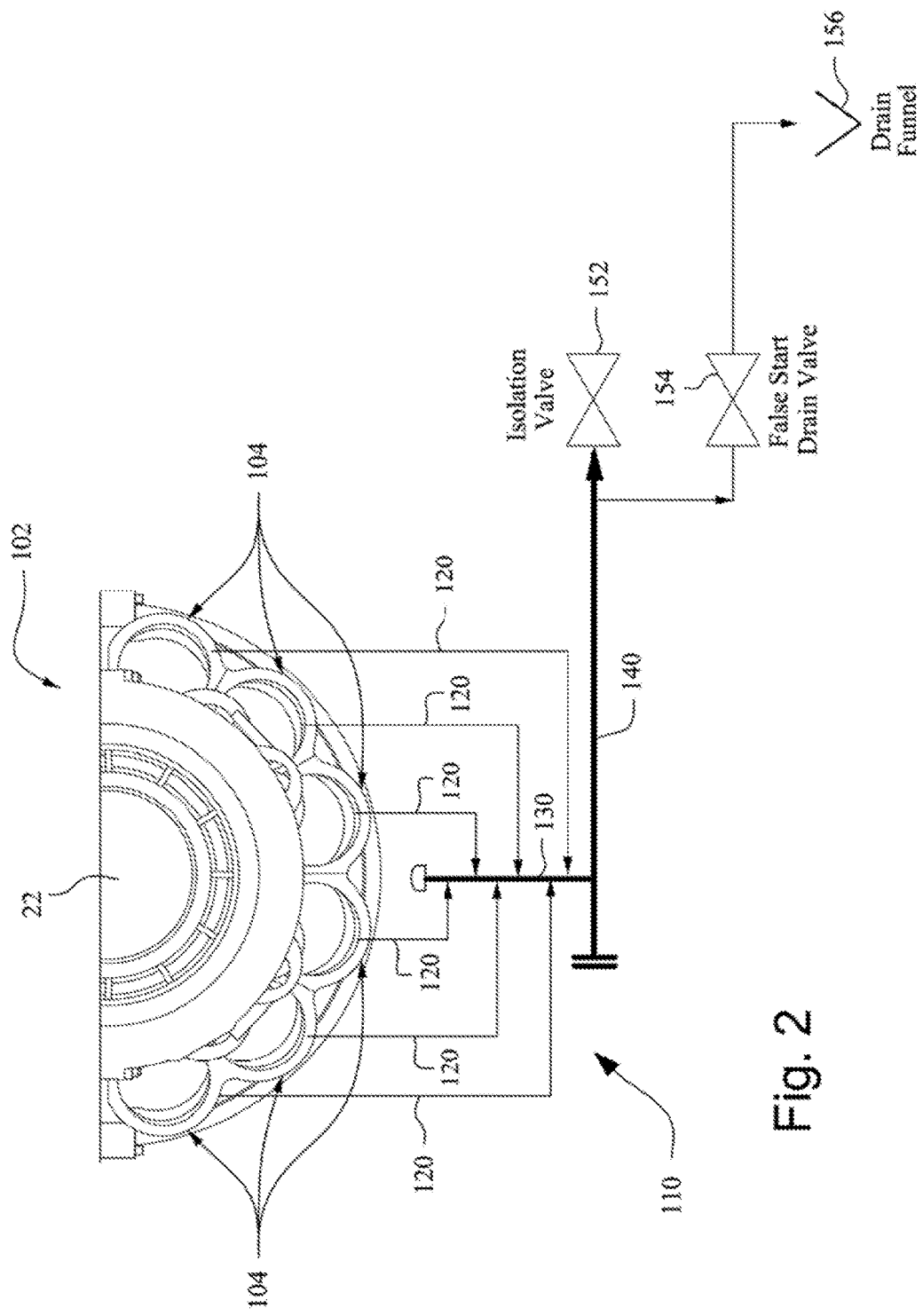
FIG. 2 is a schematic representation of a lower half of a combustor and a combustor can drain system in accordance with an example of the disclosed technology.

Combustor 16 directs the exhaust gases through a turbine 18 toward an exhaust outlet 20. As the exhaust gases pass through the turbine 18, the gases force one or more turbine blades to rotate a shaft 22 along an axis of the system 10. Referring to FIGS. 1 and 2, the combustor 16 may include a plurality of combustor cans 104 disposed annularly about the shaft 22 between a compressor 24 and the turbine 18.

As illustrated, the shaft 22 may be connected to various components of the turbine system 10, including the compressor 24. The compressor 24 also includes blades that may be coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, Which may be a vehicle or a stationary load, such as an electrical generator in a power plant or a propeller on an aircraft, for example. As will be understood, the load 28 may include any suitable device capable of being powered by the rotational output of turbine system 10.

Turning to FIG. 2, a lower half 102 of the combustor is shown. A plurality of combustor cans 104 are disposed annularly about the shaft 22. The combustor can drain system 110 is used to drain from the combustor cans 104 both water after an offline water wash process and unburnt liquid fuel after a false start event.

During the starting sequence of the turbine engine, a false start may occur in which fuel is introduced into the gas turbine engine but the engine does not begin self-sustaining combustion within a predetermined period of time. In the event of a false start of the gas turbine engine when running on liquid fuel, the unburnt liquid fuel collects inside the combustor cans 104. The combustor can drain system 110 may be used to drain the unburnt fuel.

Figure 3:
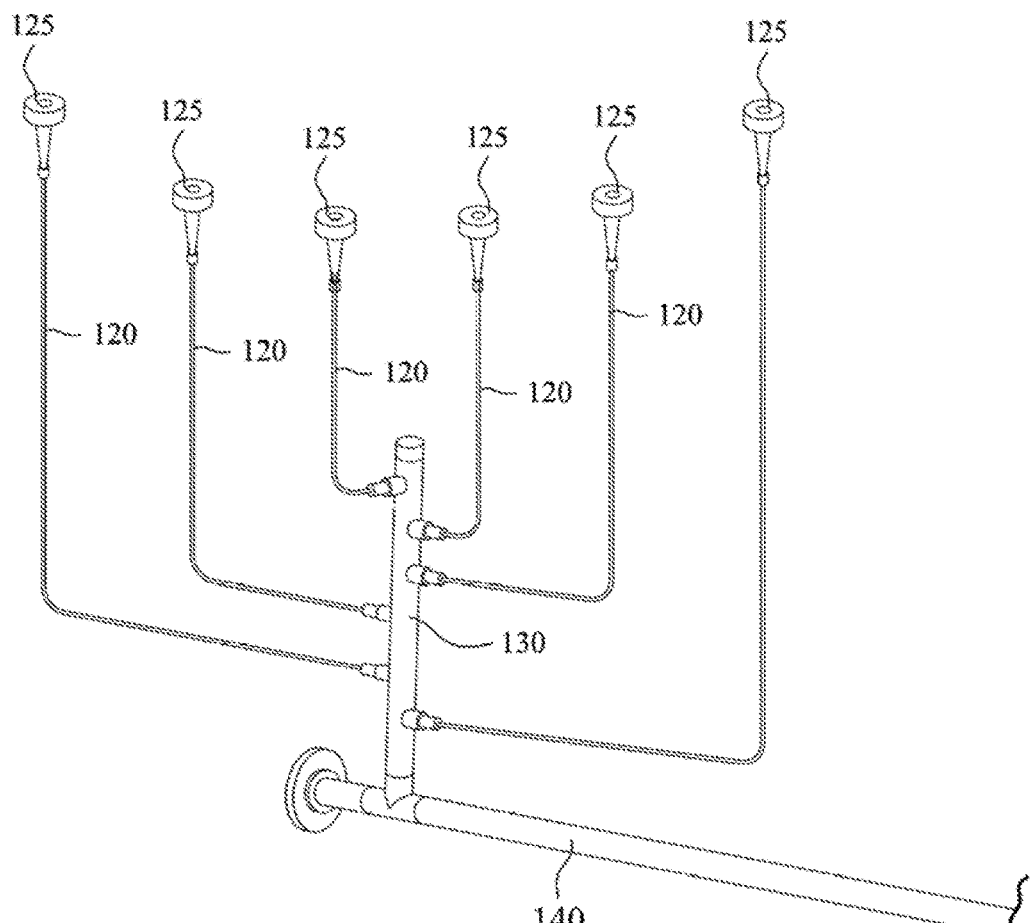
FIG. 3 is perspective view of a section of a combustor can drain system in accordance with an example of the disclosed technology.

The combustor can drain system 110 includes a plurality of drain tubes 120, a vertical header 130, a horizontal header 140, an isolation valve 152, a false start drain valve 154 and a drain funnel 156. Referring to FIGS. 2 and 3, the plurality of drain tubes 120 are connected to the lower half 102 of the combustor via connectors 125. Each drain tube 120 is connected to a low point of a respective combustor can 104.

The drain tubes may be constructed from any suitable material, as those skilled in the art will understand.

Still referring to FIGS. 2 and 3, the drain tubes 120 extend from the combustor cans 104 down to a common header, i.e., vertical header 130. Since the drain tubes are connected to a common header, during operation of the gas turbine engine, small pressure differences across the combustor cans 104 can cause hot gases to flow from one combustor can to another combustor can. This phenomenon is called cross-talk.

Specifically, hot gases may flow from one combustor can down the respective drain tube to the common header and then up another drain tube to another combustor can The flow of hot gases across the common header will cause the temperature in the common header to rise. Thus, there is a risk of local ignition if unburnt liquid fuel becomes trapped in the common header and the temperature in the common header reaches an auto-ignition temperature (e.g., ~450° F.).

As shown in FIGS. 2 and 3, the drain tubes 120 are connected directly to vertical header 130 which is in turn connected to horizontal header 140. Because the drain tubes 120 are connected directly to the vertical header 130, any cross-talk will occur in the vertical header 130. Therefore, heat transfer due to cross-talk will cause the temperature in the vertical header 130 to rise while not substantially affecting the temperature in the horizontal header 140.

Figure 4:
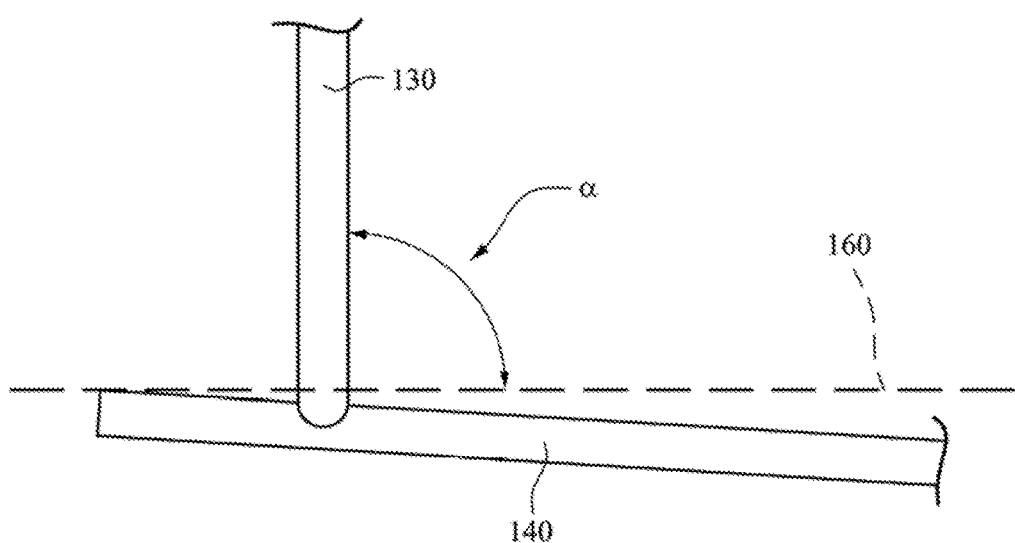
FIG. 4 is a perspective view of a vertical header and a horizontal header in accordance with an example of the disclosed technology.

Referring to FIG. 4, the vertical header 130 is disposed at an angle α with respect to a horizontal plane 160, e.g., α may be 30° to 90°, 30° to 60°, 45° to 60°, 30°, 45°, 60° to 90°, 75° to 90°, 75°, or 90°. The inclination of the vertical header 130 causes liquids in the vertical header 130 to easily flow down to the horizontal header 140, thereby preventing any unburnt liquid fuel from being trapped inside the vertical header. Thus, even if the temperature in the vertical header rises to the auto-ignition temperature, the local ignition hazard will be avoided since no liquid fuel will be trapped in the vertical header.

As can be seen in FIG. 4, the horizontal header 140 is also disposed at an angle to the horizontal plane 160 to facilitate drain off of liquids through the combustor can drain system 110; however, such angle of the horizontal header 140 is smaller than the angle of the vertical header with respect to the horizontal plane 160. Thus, the risk of unburnt liquid fuel being trapped in the horizontal header 140 is greater than the risk of unburnt liquid fuel being trapped in the vertical header 130. However, because cross-talk occurs in the vertical header 130, not the horizontal header 140, the temperature in the horizontal header will not reach the auto-ignition temperature; therefore, local ignition in the horizontal header 140 will be avoided.

Still referring to FIG. 4, due to their relative arrangements with respect to the horizontal plane 160, the vertical header 130 and the horizontal header 140 are disposed at an angle to one another.

Turning back to FIG. 2, during an offline water wash, the isolation valve 152 and/or the false start drain valve 154 may be used to drain the water, as those s filled in the art will understand. The isolation valve 152 may be a manual valve. During a false start event, the false start drain valve 154 opens to drain the unburnt liquid fuel to a drain funnel 156. The false start drain valve 154 may be configured as an automatic pneumatically-operated valve, as those skilled in the art will understand.

The presence of the vertical header 130 eliminates the need to provide lengthier drain tubes 120 in an effort to facilitate more heat transfer of the hot gases from the drain tubes so as to minimize the temperature rise in the common header. There is also no need to zig-zag the routing of the drain tubes 120 in an effort to minimize temperature rise in the common header by creating more pressure drop so as to reduce the mass flow of hot gases through the drain tubes.

As such, drain tubes 120 having shorter lengths and routed directly to the vertical header 130 can be utilized. Thus, a smaller number of support structures will be needed to support the drain tubes. Further, this design will occupy less space thereby improving access to the turbine system 10 which facilitates maintenance.

While the invention has been described in connection with what is presently considered to be the most practical and preferred examples, it is to he understood that the invention is not to be limited to the disclosed examples, but on the contrary, is intended to cover various modifications and equivalent arrangements included within the spirit and scope of the appended claims.

What is claimed is:

1. A drain system for a combustor of a gas turbine, the combustor including a plurality of combustor cans, comprising:
    a plurality of drain tubes, each drain tube having a first end adapted to be connected to a respective combustor can of the gas turbine to drain liquid therefrom;
    a vertical header connected to a second end of each drain tube to receive a fluid flow therefrom;
    a horizontal header downstream of the vertical header and in fluid communication therewith; and
    a false start drain valve configured to open after a false start event, the false start drain valve being positioned downstream of the vertical header,
    wherein the vertical header is disposed at an angle between 30° and 90° with a horizontal plane,
    wherein the vertical header is disposed at an angle with respect to the horizontal header,
    wherein the horizontal header is inclined with respect to the horizontal plane to facilitate drainage of the liquid such that an angle of the horizontal header with respect to the horizontal plane is smaller than the angle of the vertical header with respect to the horizontal plane, and
    wherein the vertical header is arranged to enable hot gases from a first combustor can of the plurality of combustor cans to flow to a second combustor can of the plurality of combustor cans thereby causing the temperature in the vertical header to be higher than the temperature in the horizontal header.

2. The drain system of claim 1, wherein the drain tubes are configured to drain residual liquid fuel from the combustor cans after the false start event.

3. The drain system of claim 2, wherein the false start drain valve is connected to the horizontal header.

4. The drain system of claim 3, wherein the false start drain valve is pneumatically operated to open after the false start event to drain the residual liquid fluid.

5. The drain system of claim 1, wherein the angle is between 30° and 60°.

6. The drain system of claim 5, wherein the angle is 45°.

7. The drain system of claim 1, wherein the angle is between 60° and 90°.

8. The drain system of claim 7, wherein the angle is between 75° and 90°.

9. The drain system of claim 8, wherein the angle is 90°.

10. A system for a gas turbine, comprising:
    a turbine combustor including a plurality of combustor cans; and a drain system including:
- a plurality of drain tubes, each drain tube having a first end adapted to be connected to a respective combustor can of the plurality of combustor cans to drain liquid therefrom;
- a vertical header connected to a second end of each drain tube to receive a fluid flow therefrom;
- a horizontal header downstream of the vertical header and in fluid communication therewith; and
- a false start drain valve configured to open after a false start event, the false start drain valve being positioned downstream of the vertical header,
- wherein the vertical header is disposed at an angle between 30° and 90° with a horizontal plane,
- wherein the vertical header is disposed at an angle with respect to the horizontal header,
- wherein the horizontal header is inclined with respect to the horizontal plane to facilitate drainage of the liquid such that an angle of the horizontal header with respect to the horizontal plane is smaller than the angle of the vertical header with respect to the horizontal plane, and
- wherein the vertical header enables hot gases from a first combustor can of the plurality of combustor cans to flow to a second combustor can of the plurality of combustor cans thereby causing the temperature in the vertical header to be higher than the temperature in the horizontal header.

11. The system of claim 10, wherein a lower-most point of each combustor can is connected to a respective drain tube.

12. The system of claim 11, wherein the drain tubes are configured to drain unburnt liquid fuel from the plurality of combustor cans after a false start event.

13. The system of claim 10, wherein the angle is between 30° and 60°.

14. The system of claim 13, wherein the angle is 45°.

15. The system of claim 10, wherein the angle is between 60° and 90°.

16. The system of claim 15, wherein the angle is between 75° and 90°.

* * * * *

UNITED STATES PATENT AND TRADEMARK OFFICE
CERTIFICATE OF CORRECTION

Page 1 of 1

PATENT NO. : 10,082,083 B2
APPLICATION NO. : 14/978261
DATED : September 25, 2018
INVENTOR(S) : Dhiraj Mahadik et al.

It is certified that error appears in the above-identified patent and that said Letters Patent is hereby corrected as shown below:

In the Specification

Column 2, Line 22, change "nozzles" to --fuel nozzles--

Column 2, Line 41, change "Which" to --which--

Column 3, Line 2, change "an" to --art--

Column 3, Line 13, change "can The" to --can. The--

Column 3, Line 57, change "s filled" to --skilled--

Column 4, Line 13, change "he" to --be--

Signed and Sealed this
Sixth Day of November, 2018

Andrei Iancu
*Director of the United States Patent and Trademark Office*